United States Patent [19]

Haendle et al.

[11] 4,398,213
[45] Aug. 9, 1983

[54] X-RAY DIAGNOSTIC INSTALLATION FOR PROVIDING SUBTRACTION IMAGES

[75] Inventors: Joerg Haendle, Erlangen; Wolfgang Maass, Nuremberg; Hans-Dieter Wolf, Erlangen, all of Fed. Rep. of Germany

[73] Assignee: Siemens Aktiengesellschaft, Berlin & Munich, Fed. Rep. of Germany

[21] Appl. No.: 252,299

[22] Filed: Apr. 9, 1981

[30] Foreign Application Priority Data

May 12, 1980 [DE] Fed. Rep. of Germany ....... 3018129

[51] Int. Cl.$^3$ .............................................. H04N 5/32
[52] U.S. Cl. ................................... 358/111; 358/167; 378/99
[58] Field of Search ...................... 358/111, 167, 166; 250/416 TV, 320, 321; 378/98, 99, 100, 165, 166, 176, 29, 38, 40, 62, 63

[56] References Cited

U.S. PATENT DOCUMENTS

| 4,204,225 | 5/1980 | Mistretta. | |
|---|---|---|---|
| 4,204,226 | 5/1980 | Mistretta et al. | |
| 4,296,436 | 10/1981 | Achiha | 358/167 |
| 4,337,514 | 6/1982 | Faureau et al. | 358/166 |
| 4,345,314 | 8/1982 | Melamud et al. | 358/166 |

Primary Examiner—Robert L. Griffin
Assistant Examiner—Edward L. Coles
Attorney, Agent, or Firm—Hill, Van Santen, Steadman & Simpson

[57] ABSTRACT

In an exemplary embodiment, video images from a television pickup device corresponding to the x-ray images are supplied to an image store and to a difference stage for the purpose of providing subtraction images through difference formation from the stored and the current video signal. The difference stage is connected with a first adder which in turn is connected with a second image store, whose output signal is supplied to a first adder, so that the image point data of the difference stage are summed in the second image store. The output signal of the second image store is supplied to the monitor.

9 Claims, 3 Drawing Figures

X-RAY DIAGNOSTIC INSTALLATION FOR PROVIDING SUBTRACTION IMAGES

BACKGROUND OF THE INVENTION

The invention relates to an x-ray diagnostic installation utilizing a television pickup system, and comprising an image store, a difference stage for providing subtraction images through difference formation from the stored and the actual video signal, and a monitor. Subtraction images are employed in the case of fluoroscopic examination, particularly in the case of selective angiography, in order to make clearly visible blood vessels which, in the normal x-ray image, can only be poorly recognized or on which bone structures are superimposed.

In the case of fluoroscopic subtraction, images with contrast medium filling are taken and stored and subtracted from images without contrast medium filling. A subtraction of two picture records can proceed photographically or by television-technical means. In the case of television subtraction which is predominantly in use today, the image taken during the presence of a contrast medium is stored either by means of a photographic medium which can be scanned by a second television camera, or by means of a video image store. In an electronic difference amplifier the video signals are subtracted from one another. The resulting difference images are displayed on a monitor and predominantly contain only the representation of the blood vessels with the contrast medium present.

Since all vessels must be simultaneously filled for a representation, in the case of an image taken during the presence of the contrast medium, high contrast medium quantities must be employed. In order to take contrast medium images, the entire injection operation is recorded in a video store. The photograph (or radiograph) best representing the vascular tree is selected and employed for subtraction. The subtraction images thus prepared exhibit an image quality which is not always satisfactory. Moreover, many manipulations must take place, so that the method for preparing subtraction images is cumbersome. Furthermore, through this known method, the patient is greatly stressed due to high contrast medium quantities and a large x-ray dose.

In the German OS No. 2,919,425, it is therefore proposed, for the storage of the video signals, to previously conduct an integration over several images. These stored signals and the current video signals are subtracted. The difference signals are displayed on the monitor. Although the quantum noise is improved in this way, an optimum representation of the vessel paths with low contrast medium quantities does not occur.

SUMMARY OF THE INVENTION

The invention proceeds from the object of producing an x-ray diagnostic installation of the type initially cited, which is easy to operate, which can be manufactured with only a low outlay, and which produces images of high quality which are distinguished by low image noise and great brightness differences (dynamic range).

In accordance with the invention, the object is achieved in that a first adder is connected at the output side of the difference stage, which adder is connected with a second image store whose output signal is fed back to the first adder, so that, in the second image store, the image point data of the difference stage are summed, and that the output signal of the second image store is delivered to the monitor. Through this arrangement, the difference video signal, characterizing the blood vessels, is added during the entire contrast agent injection procedure, so that a television image with high contrast results.

A virtually complete suppression of quantum noise can be achieved if a threshold value circuit is arranged between the second image store and the monitor. The difference signal can be superimposed with the video signal of the blank image (taken without contrast medium being present) if a second adder is provided to which the output signal of the second image store and the video signal, stored in the first image store, are supplied, and if the output signal of the second adder controls the monitor.

The contrast medium flow can be chronologically evaluated if an evaluating circuit for time evaluation is provided which is subjected to output signals of the difference stage and in which the chronological occurrence of variations of these output signals is recognized and converted into color video signals, if the monitor is designed as a color monitor and if an image mixer is connected between the image store and the color monitor in which image mixer the output signal of the image store and the evaluating circuit is supplied in a mixed fashion to the color monitor. This inventive evaluating circuit is advantageously embodied by the additional subclaims.

The invention shall be explained in greater detail in the following on the basis of exemplary embodiments illustrated on the accompanying drawing sheet; and other objects, features and advantages will be apparent from this detailed disclosure and from the appended claims.

DETAILED DESCRIPTION

Figure 1:
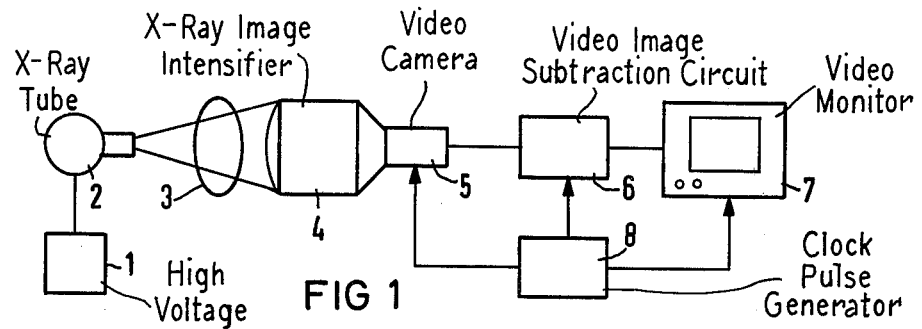
FIG. 1 illustrates a block circuit diagram of an inventive x-ray diagnostic installation.

In FIG. 1, an x-ray diagnostic installation comprising an x-ray tube 2 fed by a high voltage generator 1, is illustrated, in whose path of rays a patient 3 is disposed. An x-ray image intensifier 4, following in the path of rays, is connected with a television camera 5 whose output is supplied to a subtraction circuit 6. The signal processed therein is displayed on a monitor 7. A synchronizing clock pulse generator 8 controls the synchronization of the chronological functional sequences of the television camera 5, the subtraction circuit 6 and the monitor 7.

Figure 2:
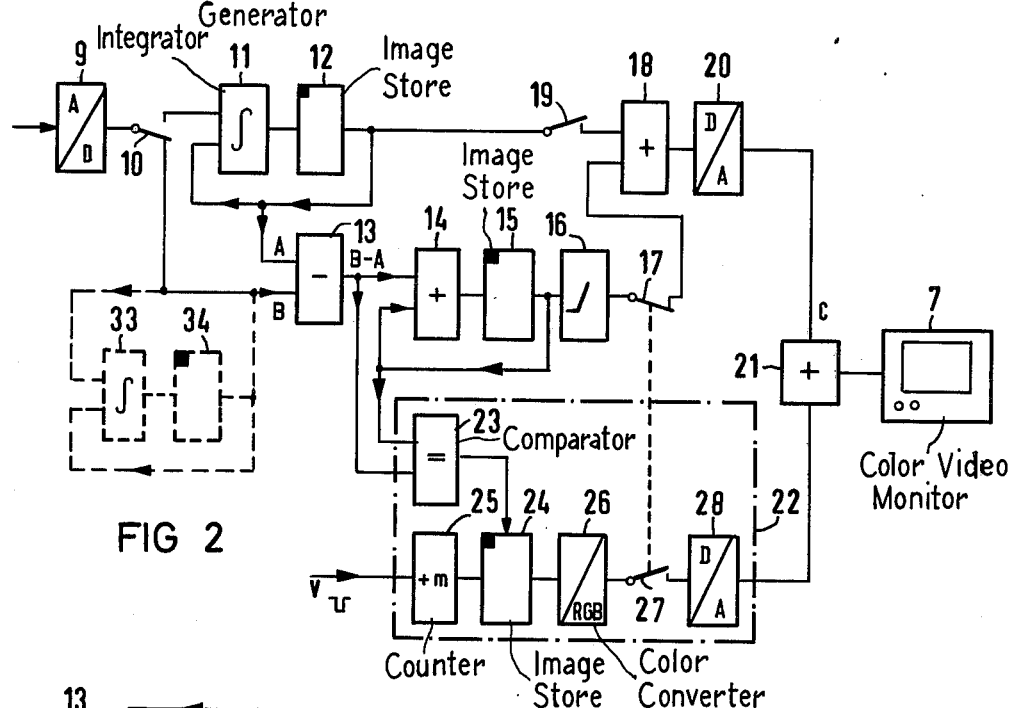
FIG. 2 illustrates a block circuit diagram of the subtraction circuit of the x-ray diagnostic installation according to FIG. 1.

The video signal of the television camera 5 is supplied to the subtraction circuit 6, illustrated in FIG. 2, which video signal is separated into digital image points in an analog-to-digital converter 9 (A/D-converter), forming the input stage. The output of the A/D-converter 9 is connected with a changeover switch 10 whose one switching contact is coupled to an integration stage 11. The output signal of the integration stage 11 is read into an image store 12, whose output is fed back to the input of the integration stage 11. The second switching contact of the changeover switch 10 is connected with a difference stage 13 in which the video signal, stored in the image store 12, is subtracted from the current (present) video signal.

The difference signal thus formed is supplied to a first adder 14, whose output signal is stored in a second image store 15. The output of the second image store 15 is fed back to the first adder 14, so that, in the second image store 15, the sum of all difference signals is stored. The output of the second image store 15 is connected with the threshold value circuit 16 in which small amplitudes, brought about in particular by the quantum noise, are suppressed. The output of the threshold value circuit 16 is connected via a first switch 17 to a second adder 18. Via an interrupter 19 it is possible to supply, to the second adder 18, the stored signal to the blank image which, superimposed with the summed difference signal, is delivered to a first digital-to-analog converter 20 (D/A-converter). Its analog output is connected with the point C forming the input of an image mixer 21.

Connected in parallel with this circuit, for the local evaluation of the difference signal, is an evaluating circuit 22 which provides a color time representation of the occurrence of the difference signal.

The input stage of the evaluating circuit 22 is formed by a comparator 23 in which the output signal of the difference stage 13 and of the second image store 15 are compared with one another for each image point. If the value of an image point of the output signal of the difference stage 13 is greater than that of the stored, summed, signal, then a memory command is transmitted to the memory position—pertaining to the image point—of a third image store 24. In the latter, the respective counter-reading of a counter 25 is stored which is subjected to the vertical sync signals of the television camera 5 and thus forms a time scale by counting the image scannings. Through the size of the stored numerical values of the counter 25, the first chronological occurrence of a difference signal is retained for each image point.

The stored image point values are converted into color signals in a color converter 26 corresponding to their magnitudes. A following second switch 27 is mechanically connected with the first switch 17 in such a fashion that either a color signal, characterizing the chronological occurrence of the difference signal, or the black-white summation signal of the difference signals, is supplied to the color monitor 7. Following the second switch 27, a second D/A-converter 28 is arranged, which is connected with the image mixer 21. Its output signal is displayed on the color monitor 7.

In order to provide subtraction images, the changeover switch 10 first connects the integration stage 11 with the A/D-converter 9, so that the digital video signal is integrated over several television images and stored in the image store 12 in order to obtain a noise-free blank image. Subsequent to the switching-over, the patient is injected with a small amount of a contrast medium which can be weakly recognized in the x-ray image. The output signal of the difference stage 13 characterizes the progression of the contrast medium. Through summation of several successive images the amplitude of the difference signal is amplified, so that a clearly recognizable signal is produced over the entire path of the contrast medium. The summation in the first adder 14 can proceed with an evaluation of the two signals.

Through the threshold value circuit 16 the values characterizing a low amplitude, which are brought about by the quantum noise, are suppressed, so that only the large values characterizing the contrast medium flow, which generate a noise-free image, are transmitted. In the second adder 18, by means of the interrupter 19, the blank image can be selectively superimposed on the image of the contrast medium progression. The summation signal is displayed on the monitor 7.

In order to obtain information regarding the chronological appearance of the contrast medium, the output signals of the difference stage 13 and of the second image store 15 are further processed in the evaluating circuit 22.

In the input stage, at the comparator 23, the summed difference signal, (the output signal of the second image store 15), is compared in image-point fashion with the current (present) difference signal of the difference stage 13. If the current difference signal is greater than the previous sum signal, a positive value results at the output of comparator 23 which triggers a memory operation in the third image store 24. This signifies that the current image point exhibits a greater optical density than the stored image point. This optical density is generated by the progressive contrast medium flow. The reading of the counter 25, connected to the input of the third image store 24, is read into the corresponding memory position by the memory command. If, by contrast, the output values of the image store 15 are greater than those of the difference stage; i.e., if a change, brought about by the contrast medium flow, had already occurred, or no change had taken place, then a negative signal is supplied at the output of the comparator 23 which has no further significance.

The varying magnitudes of the stored count values represent the chronological progression of the first appearance of the contrast medium. These values, stored in the third image store 24, in dependence upon their magnitude are converted into corresponding color values in the color converter 26 and displayed on the color monitor 7.

Through the two mechanically connected switches 17, 27, the black-white local representation or the color chronological representation can be selectively displayed on the monitor. The blank image can be superimposed on this image by means of the interrupter 19.

Figure 3:
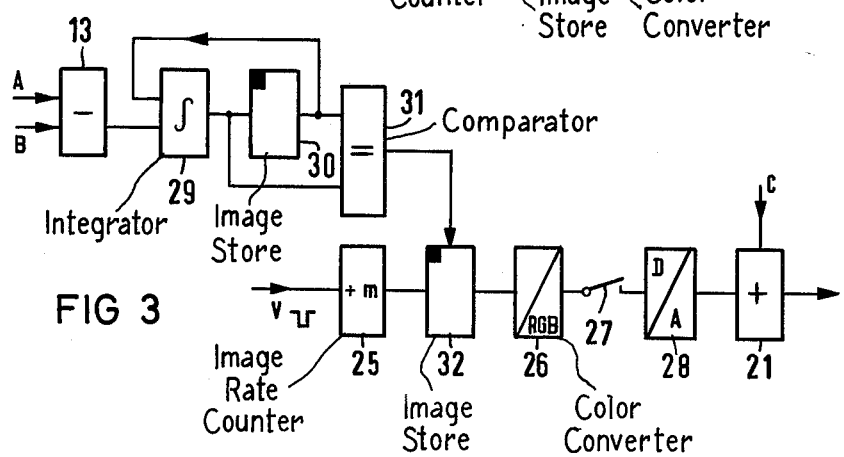
FIG. 3 illustrates a block circuit diagram of another embodiment of the evaluating circuit according to FIG. 2.

In FIG. 3, a further embodiment of the evaluating circuit 22 is illustrated. The output of the difference stage 13, subjected to the stored signal A and the current (present) signal B, is connected with an integration stage 29 whose output is coupled to a third image store 30. The output signal of the third image store 30 is fed back to the integration stage 29. The output signals of the integration stage 29 and of the image store 30 are compared with one another in a comparator 31 whose output is connected with a fourth image store 32. The counter 25, subjected to the vertical sync signals of the television camera 5, is connected with the data input of the fourth image store 32. The output signal of the fourth image store 32 is supplied to the color converter 26, whose output is connected via the switch 27 with the second D/A converter 28. The second D/A converter 28 is connected with the image mixer 21 whose output signal is displayed on the color monitor 7.

Through the integration stage 29 and the feedback loop coupled via the third image store 30, the difference signal is integrated during the entire fluoroscopic examination. The output signals of the integration stage 29 and of the third image store 30 are compared in the comparator 31. If the output value of the integration stage 29 of an image point is greater than the corresponding image point value of the third image store 30, then the numerical value supplied by the counter 25 is stored in the memory position of the fourth image store 32, which memory position is associated with the image point. If, by contrast, the integration stage 29 delivers a smaller signal than the third image store, then a negative output signal results at the comparator 31 which interrupts the memory operation. Through this comparison, that particular value of the counter 25 remains stored, respectively, in the fourth image store 32, which value corresponds to the maximum of the contrast medium flow. These output values of the fourth image store—characterizing the chronological occurrence of the maximum—are converted into color signals in the color converter 26 and supplied via the switch 27 to the second D/A-converter 28 which mixes the video signal of the blank image (taken without contrast medium being present) with the color signal in the image mixer 21 and reproduces this on the color monitor 7.

If the first switch 17 and the second switch 27 are not mechanically interconnected and both switches 17 and 27 are closed simultaneously, then the possibility also exists of the superimposition of the color image, with the black-white image which is characterized by various gray levels. The quantity of the contrast medium flow and its chronological appearance (occurrence) on the monitor can hereby be recognized in a simple fashion.

In order to also free the current image as much as possible from quantum noise, as illustrated in FIG. 2 in broken lines, there can be provided, between the changeover switch 10 and input B of the difference stage 13, an additional integration stage 33 and an additional image store 34. This integration can proceed via a variable number of images which number is expediently matched to the rate of the movement change.

This inventive x-ray diagnostic installation renders possible a fluoroscopy image subtraction method with on-line operation which is distinguished by a low material and operating technical outlay.

It will be apparent that many modifications and variations may be effected without departing from the scope of the novel concepts and teachings of the present invention.

I claim as my invention:

1. An x-ray diagnostic installation operable to produce video images for representing the results of an x-ray examination, and including a first image store, a difference stage connected with the output of the first image store for the purpose of providing subtraction images through difference formation, and a monitor, wherein the improvement comprises a second image store (15), a first adder (14) connected with the output of the difference stage (13), and connected with the second image store (15), so that, in the second image store (15), the image point data from the difference stage (13) for successive subtraction images are summed to provide a resultant image, the output of the second image store (15) being connected with said monitor (7) for display of such resultant image.

2. An x-ray diagnostic installation according to claim 1, with a threshold value circuit (16) arranged between the second image store (15) and the monitor (7).

3. An x-ray diagnostic installation according to claim 1, with a second adder (18) coupled to the output of the second image store (15) and the first image store (12), and the output signal of the second adder (18) controlling the monitor (7).

4. An x-ray diagnostic installation according to claim 1, with an evaluating circuit (22) being provided for the purpose of time evaluation, which is subjected to output signals of the difference stage (13), and in which the chronological appearance of variations of these output signals is recognized and converted into color video signals, the monitor being designed in the form of a color monitor (7), and an image mixer (21) being connected between the first image store (12) and the color monitor (7), the output signal of the image store (12) and of the evaluating circuit (22) being supplied in a mixed fashion to the color monitor (7).

5. An x-ray diagnostic installation according to claim 4, with the evaluating circuit (22) comprising a comparator (23) connected with the outputs of the difference stage (13) and of the second image store (15) and operative to supply an output signal when a comparison condition is attained, a third image store (24) controlled by the output signal of the comparator (23), a counter (25) counting image sync signals corresponding to the presentation of the output signals of the difference stage and of the second image stage (15) to the comparator (23), and connected with said third image store for supplying an attained count value thereto when the comparator (23) supplies its output signal, whereby, in dependence upon the output signal of the comparator (23), that particular counter-reading is stored for each image point which counter-reading corresponds to the first appearance of a difference between the current difference signal and the signal stored in the second image store (15), and a color converter (26) connected with the third image store (24) for converting the output signals of the third image store into time-dependent color signals, the image mixer (21) coupling said color converter (26) with said color monitor (7).

6. An x-ray diagnostic installation according to claim 4, with the evaluating circuit (22) comprising third and fourth image stores (30, 32), and having an integration stage (29) to which the image point data from the difference stage (13) is supplied and whose output is fed back to its input via the third image store (30), a comparator (31) for comparing the output signal of the integration stage (29) and that of the third image store (30), and having its output signal controlling the fourth image store (32) for each image point in dependence upon the chronological appearance of the maximum of the output signal from the difference stage (13), a counter (25) counting image sync signals corresponding to the rate of presentation of the output signals of the third image store (30) and of the integrator (29) to the comparator (23) and connected with said fourth image store for supplying an attained count value thereto when the comparator (23) supplies its output signal, a color converter (26) connected with the output of the fourth image store (32), said image mixer (21) being connected with the color converter (26) so that the output signals of the first image store (12) and of the color converter (26) are supplied to the color monitor (7) in a mixed fashion.

7. An x-ray diagnostic installation according to claim 4, with a first switch (17) between the second image store (15) and the image mixer (21), and a second switch (27) operable in an inverted mode relative to said first switch (17) and arranged between the color converter

(26) of the evaluating circuit (22) and the image mixer (21).

8. An x-ray diagnostic installation according to claim 1, with an integration stage (11) connected with the image store (12) so that the stored video signal is integrated over a plurality of video image cycles.

9. An x-ray diagnostic installation according to claim 1, with said difference stage (13) having an integration stage (33) and an additional store (34), whose output is connected with the difference stage (13).

* * * * *